United States Patent [19]
Lambert et al.

[11] 3,869,327
[45] Mar. 4, 1975

[54] WATER TIGHT SEAMING OF FLEXIBLE THERMOPLASTIC SHEET MATERIAL

[75] Inventors: Everette M. Lambert, Littleton; Richard L. Ball, Denver, both of Colo.

[73] Assignee: Drake, Crandell & Batchelder, Ft. Collins, Colo.

[22] Filed: Sept. 5, 1972

[21] Appl. No.: 286,181

[52] U.S. Cl. ............. 156/256, 5/348 WB, 156/290, 156/306, 156/322, 156/497, 156/499, 156/513, 156/514, 156/517, 161/145
[51] Int. Cl. ...................... B29c 27/02, A47c 27/08
[58] Field of Search ..... 5/348 R, 348 WB; 156/306, 156/145, 290, 250, 274, 322, 256, 497, 499, 513, 514, 517; 161/145

[56] References Cited
UNITED STATES PATENTS

| | | | |
|---|---|---|---|
| 2,367,725 | 1/1945 | Lindh et al. | 5/348 R |
| 2,767,941 | 10/1956 | Gegner et al. | 156/145 |
| 2,990,070 | 6/1961 | Cushman | 5/348 R |
| 2,999,042 | 9/1961 | Meister | 156/290 |
| 3,600,727 | 8/1971 | Williams | 5/348 WB |
| 3,610,689 | 10/1971 | Smith | 5/348 R |
| 3,753,819 | 8/1973 | Mollura | 156/306 |
| 3,753,823 | 8/1973 | Kuss | 156/227 |

*Primary Examiner*—George F. Lesmes
*Assistant Examiner*—Charles E. Lipsey
*Attorney, Agent, or Firm*—Ralph F. Crandell; John G. Batchelder

[57] ABSTRACT

Methods and apparatus for forming a water tight seam useful in the production of water beds or water tight envelopes from flexible thermoplastic sheet material. A pair of thermoplastic sheets are thermally bonded to each other by a continuous first seam integrally joining the peripheral edges of the two sheets to each other to form a closed envelope. An elongate strip or band of thermoplastic sheet material is then thermally bonded to the joined sheets in overlying relationship to the first peripheral seam. The strip or band is automatically applied by a machine having a stationary head which is inserted into the interior of the closed envelope through a slit cut in one of the joined sheets for this purpose. A moveable head on the machine is then lowered into an operative position in which the joined sheets are clamped between drive rolls mounted in the two heads, the peripheral first seam joining the two sheets extending between the two heads in a direction normal to the axis of the drive rolls. The peripheral first seam cooperates with guiding mechanism mounted on the heads to assist in guiding the envelope as the first seam is progressively advanced through the heads by operation of the drive rolls. The strip or band is concurrently fed through the heads at the same time and is thermally bonded to the exterior of the envelope by means of heat supplied by a hot air gun and compression applied by cooperating drive rolls. One of the cooperating drive rolls is formed in a manner such that the strips or sheets are compressed in a pattern such that the thermal bond is mechanically sound and water tight, the uncompressed portions accommodating shifting of the material during the sealing process to minimize wrinkling of the seams.

2 Claims, 24 Drawing Figures

3,869,327

WATER TIGHT SEAMING OF FLEXIBLE THERMOPLASTIC SHEET MATERIAL

BACKGROUND OF THE INVENTION

While the present invention was specifically developed for use in the commercial production of water beds, its basic utility is found in the construction or formation of relatively large water tight envelopes or bags from flexible sheet plastic material. It may also be used to form a seam joining two sheets to each other along a common edge. In essence, the water bed is simply a form of mattress which consists of a large bag or envelope of flexible water tight material filled with water. Conventionally, the envelope is constructed from flexible plastic sheet material by various techniques which almost invariably require the formation of seams. The overall dimensions of the water beds are such that a substantial volume of water, in the order of several hundred gallons, is required to completely fill the bed, which obviously requires careful attention to the avoidance of any leakage. Presently available plastic materials are sufficiently water tight and possess sufficient mechanical strength to provide adequate assurance against leakage by failure of the material itself in ordinary usage, apart from the possibility of puncture by sharp or pointed objects. Leakage problems encountered usually result from a failure of some type in the seam. The plastic sheet materials employed in the manufacture of water beds are most conveniently seamed by heat sealing or thermal bonding techniques which, because of the substantial length of the seams required, may not always achieve the optimum degree of bonding over the entire length of the seam. Because the seam can be no stronger than its weakest point, unless a high degree of care is used in the seaming process, adequate effective seam strength and integrity can be difficult to achieve consistantly.

SUMMARY OF THE INVENTION

The present invention is especially directed to a seam construction and methods and apparatus for forming the seam which result in a seam having an extremely high degree of reliability which can be efficiently manufactured on mass production scale.

In forming the seam of the present invention, a pair of sheets of plastic material are thermally bonded to each other by a first peripheral seam which bonds a narrow peripheral strip of the two sheets to each other in face-to-face engagement. This step forms a flat watertight envelope continuously sealed around its peripheral edge. A centrally located slit is then cut through one of the two sheets to enable the envelope to be slipped upon a stationary head of a reinforcing strip applying mechanism. The stationary head includes a pair of cylindrical drive rollers mounted for rotation about horizontal axis and the envelope is slipped upon the stationary head with the initially formed seam centered upon and extending in a direction perpendicular to the axis of the rollers. Those portions of the envelope on opposite sides of the first seam are flattened into a common general plane and an elongate reinforcing strip of flexible plastic material is bonded to the sheets on opposite sides of the first seam. The strip, in its transverse extent, bridges the original seam and a continuous thermal bonding band sealingly secures the opposite edges of the strip to the respective sheets, thereby forming a second seal which will prevent leakage in the event of the failure of any portion of the first seal.

Bonding of the strip to the envelope in the aforementioned relationship is accomplished by clamping the envelope against the drive rolls of the stationary head by means of a second moveable head likewise provided with a pair of cylindrical drive rolls mounted for rotation about a horizontal axis. The reinforcing strip is trained partially about the circumference of one of the drive rolls of the moveable head and is clamped against that portion of the envelope supported upon one of the drive rolls of the stationary head. The drive rolls are driven in rotation to feed the envelope and strip through the heads, a heat gun mounted in the moveable head being employed to heat the strip and envelope to accomplish a thermal bonding of the strip to the exterior of the envelope as the strip and envelope are compressed against each other during their passage through the two last mentioned drive rolls. The reinforcing strip is applied over the entire length of the first peripheral seam, with opposite ends of the strip being overlapped and thermally bonded to each other to provide a belt or girdle reinforcing the seam in its peripheral extent.

Other objects and features of the invention will become apparent by reference to the following specification and to the drawings.

METHOD OF ASSEMBLY

In FIGS. 1 through 10 of the drawings, the sequential steps of constructing a water bed (or water impervious envelope) in accordance with the present invention have been schematically illustrated. The end construction of the seam can be most clearly explained in terms of the method by which it is formed, and it is believed that the detailed description of certain apparatus employed in the formation of the seam may be more readily understandable after the method of forming the seam has been described.

Figure 1:
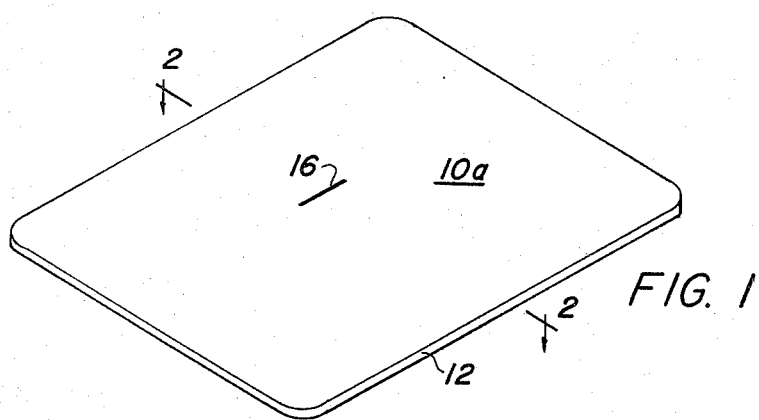
FIG. 1 is a perspective view of a watertight envelope at an initial stage of the construction of the present invention.
Figure 2:
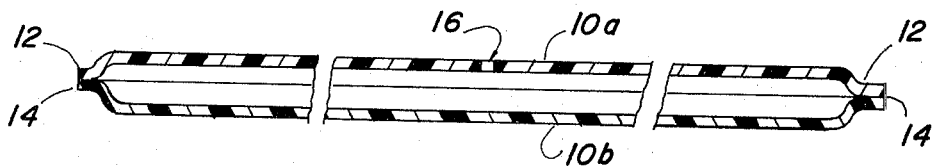
FIG. 2 is a cross-sectional view taken approximately on line 2—2 of FIG. 1.

Referring first to FIGS. 1 and 2, the initial steps in the construction of the water tight envelope consists of the thermal bonding of two sheets of a suitable plastic material to each other by means of a relatively narrow peripheral seam 12. Seam 12 is formed by any of several conventional techniques while the two individual sheets 10a and 10b are lying against each other in face-to-face relationship, the two sheets being of generally rectangular configuration with rounded corners. Seam 12 is a continuous and water tight seam and is relatively narrow—that is the width of the seam is only approximately twice the thickness of the plastic sheet material from which sheets 10a and 10b is formed. Preferably, the formation of seam 12 is combined with a trimming operation to assure that the thermal bonding between the two sheets is continuous along the outer edge 14 of the seam (FIG. 2).

Either before or after the formation of seam 12, a slit 16 is cut through sheet 10a at a central location. The purpose a slit 16 is to enable the insertion of a head 18 (FIG. 3) into the interior of the envelope for the performance of subsequent steps in the formation of the seam.

While the seam 12 is formed by melting and thermally fusing sheets 10a and 10b to each other, and in theory should thus have a resistance to rupture at least as great as that of the material of the sheets 10a and 10b, this theoretical conclusion is dependent upon a more or less perfect formation of the seam. In practice it is economically impractical to employ operating techniques and standards which will assure a consistent formation of seams such as seam 12 which will uniformly and consistently have a rupture strength equal to that of the sheet material itself. While the formation of a continuous and water tight seal at seam 12 can be achieved without too much difficulty, the strength of the seam can vary considerably over its rather substantial length, and thus it is desirable to reinforce seam 12 in the manner described below.

The reinforcement of seam 12 is accomplished by thermally bonding a reinforcing strip or band of the same plastic material as sheets 10a and 10b to the sheets in overlying bridging relationship to seam 12 to provide increased resistance against forces tending to separate the seam in a direction transversely of the seam and to also function as a girdle or belt to resist forces tending to expand the seam periphery, as when the envelope is filled with water. The reinforcing strip or band is applied to the envelope by a process best shown in FIGS. 3 through 8.

Figure 3:
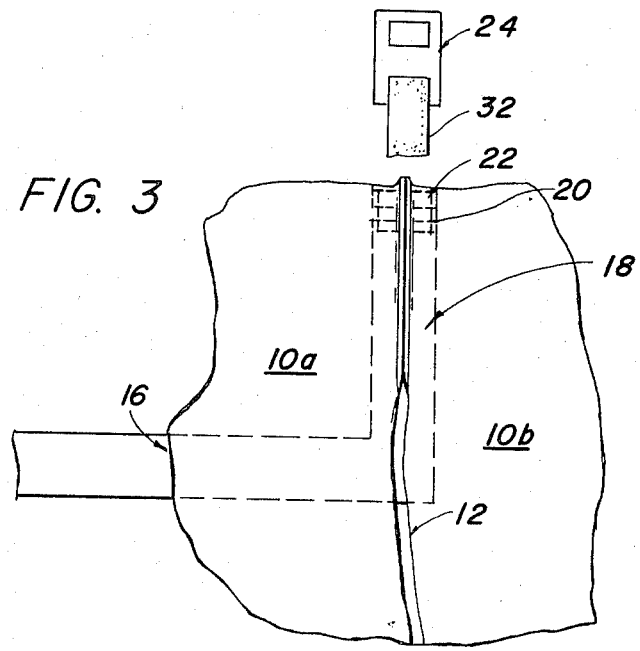
FIG. 3 is a schematic diagram showing the envelope of FIG. 1 at a subsequent stage in the process, with a schematic illustration of certain apparatus employed.
Figure 4:
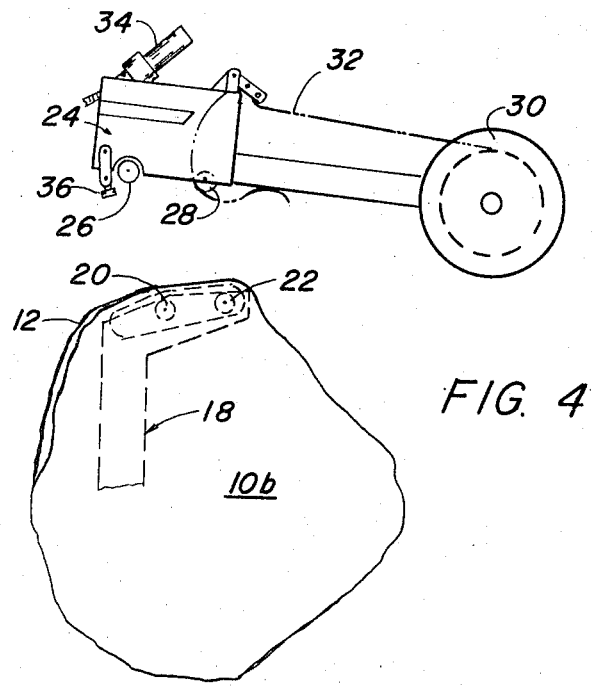
FIG. 4 is a side elevational view corresponding to FIG. 3.
Figure 5:
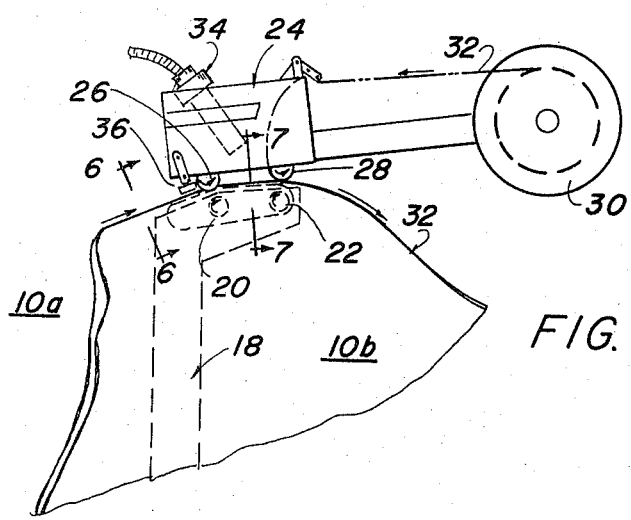
FIG. 5 is a side elevational view similar to FIG. 4 showing the apparatus in an operative position.

Referring first to FIGS. 3 through 5, a stationary head assembly 18 is inserted into the interior of the envelope formed by the bonded sheets 10a and 10b by passing the head 18 into the interior of the envelope through slit 16. Head 18 forms a portion of a seaming apparatus to be described in detail below; for purposes of description of the method, it is sufficient to note that head 18 includes a stationary frame upon which two drive rolls 20 and 22 are mounted for rotation about parallel horizontal axis. As best seen in FIG. 4, the upper portion of the periphery of rolls 20 and 22 project above the framework so that the envelope formed by sheets 10a and 10b may be supported from within upon the two rolls. Referring to FIG. 3, the envelope is centered and aligned upon rolls 20 and 22 so that seam 12 is centered axially of the rolls and extends in a direction perpendicular to the roll axis. The axial dimension of rolls 20 and 22 is approximately 3 inches so that when the envelope is positioned upon the rolls, sheets 10a and 10b are flattened to lie approximately in a common general plane upon the opposite sides of seam 12, and the flattening of the sheets in this manner thus causes seam 12 to project vertically above this common general plane by a slight amount. The vertical projection of seam 12 is employed for purposes of guiding the envelope during application of the reinforcing strip.

The seam applying apparatus to be described below includes a second or moveable head 24 which can be shifted to an open or inoperative position schematically indicated in FIG. 4 to enable the envelope to be put on or removed from head 18. Moveable head 24 includes a pair of drive rolls 26 and 28 which are rotatably mounted within head 24 for rotation about spaced parallel horizontal axis so located so that when the head is moved to the operative position shown in FIG. 5, rolls 26 and 28 drivingly clamp the envelope downwardly against roll 20 and 22 respectively. Moveable head 24 also carries a supply reel 30 upon which is wound a supply of the strip material 32 employed as the reinforcing band or strip. As best seen in FIG. 4, the free or leading end of strip 32 is trained about drive roll 28 and passes beneath roll 28 so that when moveable head 24 is moved to the operative or strip applying position of FIG. 5, strip 32 is clamped between roll 28 and that portion of the envelope which is supported upon roll 22 of stationary head 18. The various drive rolls 20, 22, 26 and 28 are coupled, by means to be described in detail below, to a suitable drive so that they may be driven in rotation in the direction indicated by the arrows in FIG. 5 to advance the envelope through the heads, strip 32 being concurrently advanced to lay the strip in overlying relationship to seam 12. As the rolls are driven to advance the envelope and strip, a heat gun 34 directs a blast of heated air against the envelope and seam 12 at a location just prior to where the envelope and strip 32 move into contact with each other in the nip between rolls 22 and 28. Heat gun 34 is controlled, in a manner to be described below, to heat the envelope and strip to a temperature such that thermal bonding is accomplished as the envelope and strip are compressed against each other between rolls 22 and 28. The envelope and strip are fed through heads 18 and 24 until the entire peripheral seam 12 has been covered by strip 32, the ends of the strip being overlapped and bonded to each other by continuing to feed the envelope past the initial point of bonding of the strip to the envelope.

Figure 6:
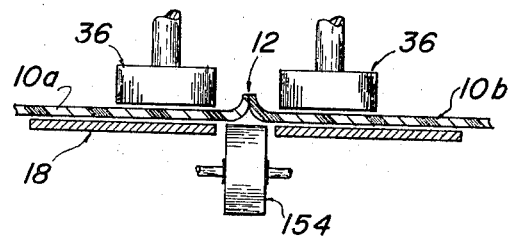
FIG. 6 is a detail cross-sectional view taken approximately on line 6—6 of FIG. 5.
Figure 7:
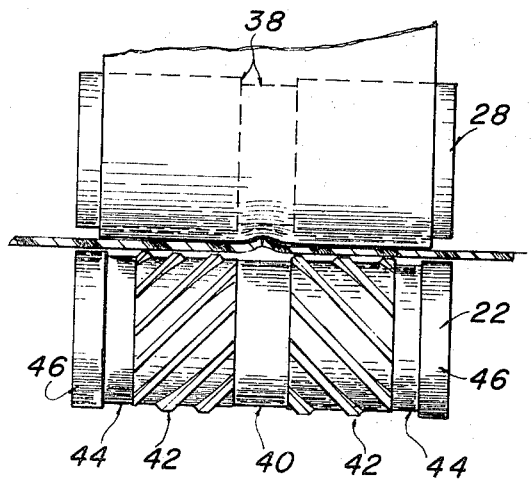
FIG. 7 is a detail cross-sectional view taken approximately on line 7—7 of FIG. 5.

During the feeding process described above, the alignment of seam 12 in centered relationship axially of the various rollers is accomplished in part by a pair of guide rollers 36 mounted for free rotation upon moveable head 24 to be located upon opposite sides of seam 12, as best seen in FIG. 6, during the feeding operation. An additional guiding or centering action is also provided by a centrally located reduced diameter section 28 (see FIG. 7) on drive roll 28 which provides a recess in which the slight centrally located bulge in the seam due to the configuration of seam 12 is received.

Reinforcing strip 12 is approximately two and one half inches in width and during the initial practice of the method, it was found that when it was attempted to thermally bond the entire surface of strip 32 to the envelope, two problems were encountered. First, as the rounded corner portions of the envelope were fed through the head, wrinkling was encountered which tended to create small creases or voids extending between strip 32 and the envelope. Further, applying a uniform compressing force, as by employing smooth continuous cylindrical surfaces on rollers 22 and 28 tended to flatten seam 12 to cause occasional separation of seam 12 during the process of bonding strip 32 to the envelope. While a continuous thermal bond between the envelope and the complete inner surface of strip 32 would obviously form a seam of the greatest mechanical strength, the wrinkling and distortion of seam 12 presented an undesirably high possibility of leakage.

To overcome these problems, roller 28 is provided with the reduced diameter section 38 (approximately ½ inch in axial width) in its center, and a corresponding reduced diameter section 40 is likewise formed on roller 22. On opposite sides of reduced diameter section 40, roller 22 is formed with a herringbone gear section 42. Outer pressure flanges 46 of the same external diameter as gear sections 42 are spaced from the axial outer ends of gear section 42 by reduced diameter sections 44. By this arrangement, compression is applied to the envelope and strip only by the teeth of herringbone gear sections 42 and by pressure flanges 46. The uncompressed portions of the envelope and strip provide regions into which excess material and air bubbles can flow to minimize wrinkling of the material.

Figure 8:
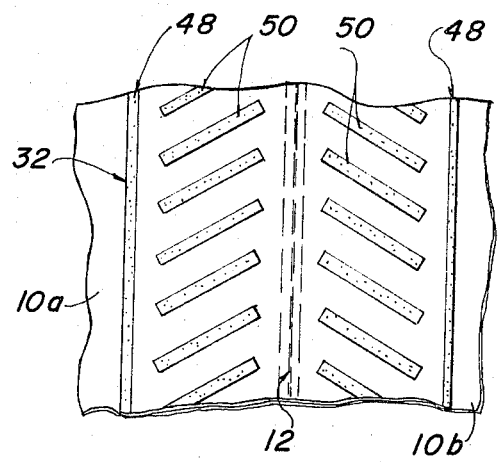
FIG. 8 is a detail plan view of the completed seam.

The temperature to which the material of the envelope and strip are heated as they move into contact at the nip of rolls 28 and 22 is such that an effective thermal bond is created only over those areas where the strip and envelope are positively compressed against each other by the teeth of gear sections 42 and flanges 46, the strip and envelope being free to shift relative to each other at all other regions. The resultant pattern of bonding is indicated in FIG. 8, strip 32 being bonded to the envelope by a continuous band along each side edge of the strip as at 48, with intermediate bonding zones 50 arranged in a herringbone-like pattern being located between, but spaced from, each band 48 and seam 12.

By relieving the opposing rolls 22 and 28 as at 38 and 40, seam 12 is not compressed or distorted during its passage through the rolls, and this relieved section further assists in the guiding action during the feeding of the envelope and strip through the heads. The spacing between bands 48 and between the various bonding zones 50 provides an area within the seam for relative movement between the strip and envelope so that wrinkles which may tend to form in either the strip or envelope can conform themselves to the unbonded region. The continuous bonded bands at 48 provide a continuous external seal independent of seam 12 so that in the event a slight separation should occur in seam 12, water cannot leak because it is confined between the two continuous sealing bands 48.

Figure 9:
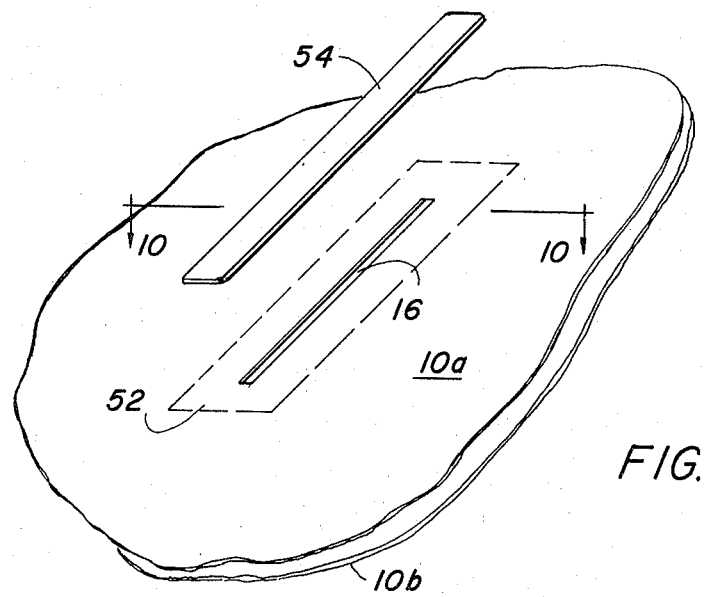
FIG. 9 is a detail perspective view indicating the final step of sealing the watertight envelope.
Figure 10:
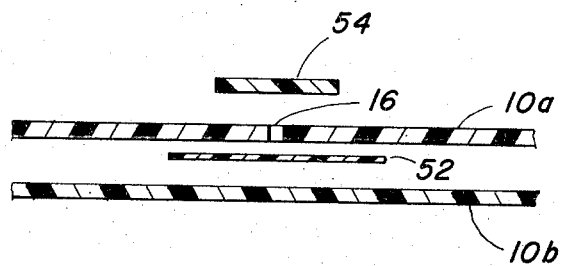
FIG. 10 is a detail cross-sectional view taken approximately on line 10—10 of FIG. 9.

After the strip 32 has been thermally bonded to the envelope as described above, head 24 is shifted to the inoperative position schematically illustrated in FIG. 4 and the envelope is removed from stationary head 18. Slit 16 is then sealed by inserting a rectangular piece of metallic foil 52 into the interior of the envelope to underlie the slip (FIGS. 6, 9 and 10). A sealing strip 54 is then thermally bonded to sheet 10a in overlying sealing relationship to the slit by a high frequency electric heater of conventional construction. The foil sheet 52 effectively prevents sheet 10b from becoming bonded to the inner side of sheet 10a during this process, the metallic foil reflecting the high frequency radiation as well as a substantial part of the heat developed during the sealing process. The envelope is now completely sealed, and in practice is provided with a removable seal type closure (not shown) at a suitable location to enable filling or draining of the envelope.

STRIP APPLYING APPARATUS

The overall construction of the apparatus employed to apply the reinforcing strip 32 to the envelope is best shown in FIGS. 11 through 14. The apparatus includes a stationary base designated generally 60 in the form of a rigid generally open rectangular frame. Preferably, a relatively wide endless belt conveyor 62 is mounted within the opening of rectangular base 60 to provide a support for the envelope during the strip applying operation which can be driven in the direction of the arrow A (FIG. 11) at a speed such that frictional resistance to feeding of the draped envelope can be minimized. Conveyor 62 is driven from other drive mechanism to be described below at a selected speed as by a schematically illustrated drive connection 64.

An upwardly inclined main frame member 66 is rigidly secured to base 60 near one corner of the base and projects upwardly from the base at an angle of approximately 60°. Main frame member 60 is of hollow box-like transverse cross section and serves as a mounting support for a control box 68, main drive motor 70 and the heater-blower unit 72 for heat gun 34. Stationary head 18 is fixedly supported from main frame member 66 by a lower horizontal frame member 74 which is fixedly cantilevered from main frame member 66 and fixedly supports a vertical post section 76 at its outer end, stationary head 18 being mounted at the upper end of post 76. Like main frame member 66, horizontal frame member 74 and post 76 are of hollow box shaped transverse cross section.

At the upper end of main frame member 66, a hollow tubular horizontal frame member 78 is fixedly secured at one end to the upper end of frame member 66 and extends horizontally from member 66 in parallel relationship to the lower horizontal frame member 74. At the outer end of tubular member 78 an elongate hollow box-like crank arm 80 is journaled on the outer end of member 78 for pivotal movement about the axis of member 78. A rigid hollow tube 82 is fixedly secured at one end to the end of crank 80 remote from tube 78 and is fixedly secured at its opposite end to the upper or moveable head 24. A rigid rod 84 concentric with and mounted upon tube 78 extends from tube 78 to rotatably support strip supply reel 30.

Figure 11:
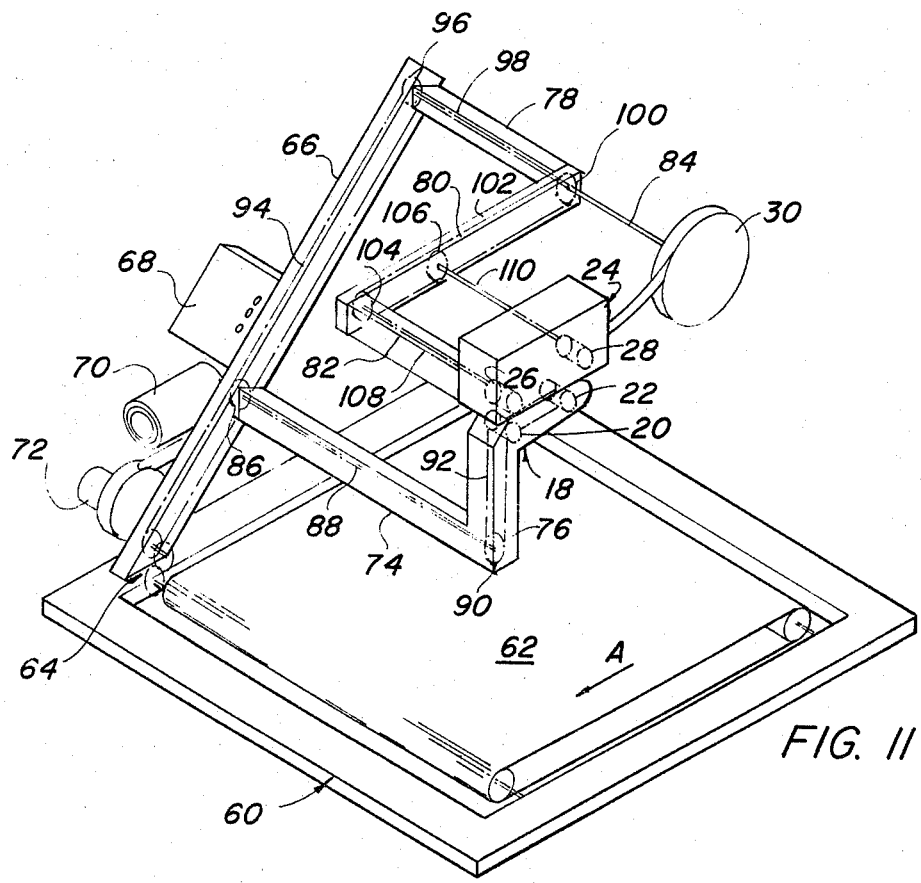
FIG. 11 is a perspective view of the strip applying apparatus of the present invention.

Drive rolls 20, 22, 26 and 28 are driven from drive motor 70 by a sprocket chain-shafting system primarily mounted within the frame assembly. Referring to FIG. 11, a main drive sprocket 86 is mounted within main frame member 66 for rotation about a horizontal axis adjacent drive motor 70. Sprocket 86 is driven from motor 70 through a suitable gear box and is fixedly coupled to a drive shaft 88 rotatably mounted within lower horizontal frame member 74. The outer end of shaft 88 carries a sprocket 90 which is drivingly coupled via an endless chain 92 to drive rolls 20 and 22 in stationary head 18 in a manner described in greater detail below.

A second endless chain 94 is trained about main drive sprocket 86 and extends upwardly through main frame member 66 to drive a sprocket 96 rotatably mounted at the upper end of frame member 66. A drive shaft 98 transmits rotation of sprocket 96 to a sprocket 100 mounted in the forward end of crank arm 80. An endless chain 102 extending through crank arm 180 transmits rotation of sprocket 100 to sprockets 104 and 106 which in turn are respectively rotatively coupled by shafts 108 and 110 to rolls 26 and 28 in the upper or moveable head 24.

Heater-blower unit 72 is operable to discharge air heated to a selected temperature, the discharge port of unit 72 being connected via a flexible tube 112 to heat gun 34.

Operation of motor 70 and heater-blower unit 72 is controlled primarily by suitable control circuitry contained in control unit 68, the operation of the heater unit being further modified by heat sensing units located to sense the temperature of air discharged from heat gun 34. Because control box 68, motor 70 and heater-blower unit 72 are conventional commercially available units and the control circuitry is likewise conventional further description of these units is believed unnecessary.

Figure 12:
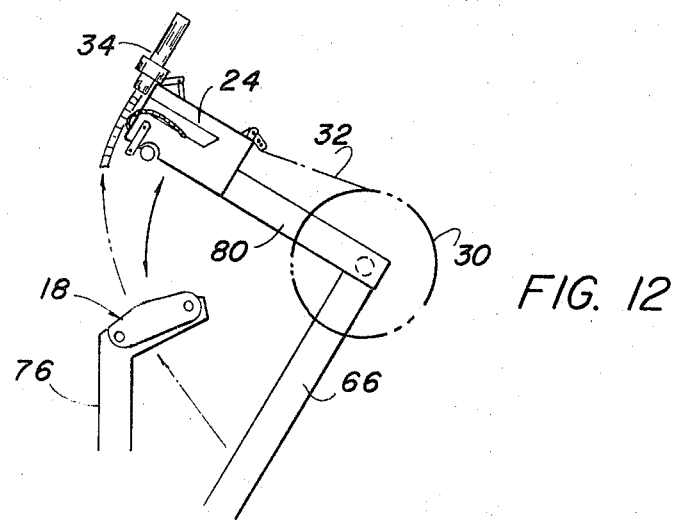
FIG. 12 is a partial side elevational view of the apparatus of FIG. 11 showing the moveable head in its open position.
Figure 13:
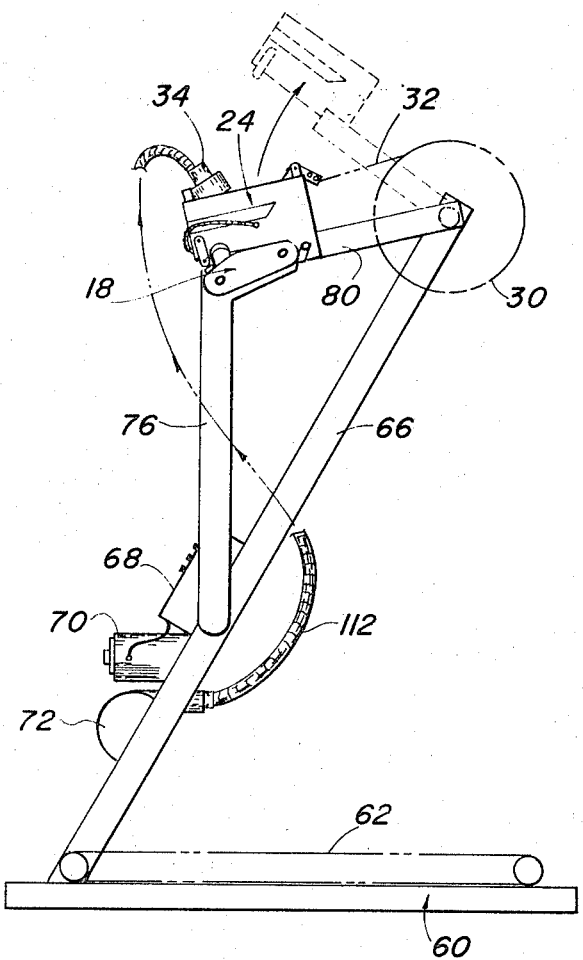
FIG. 13 is a side elevational view of the strip applying apparatus.
Figure 14:
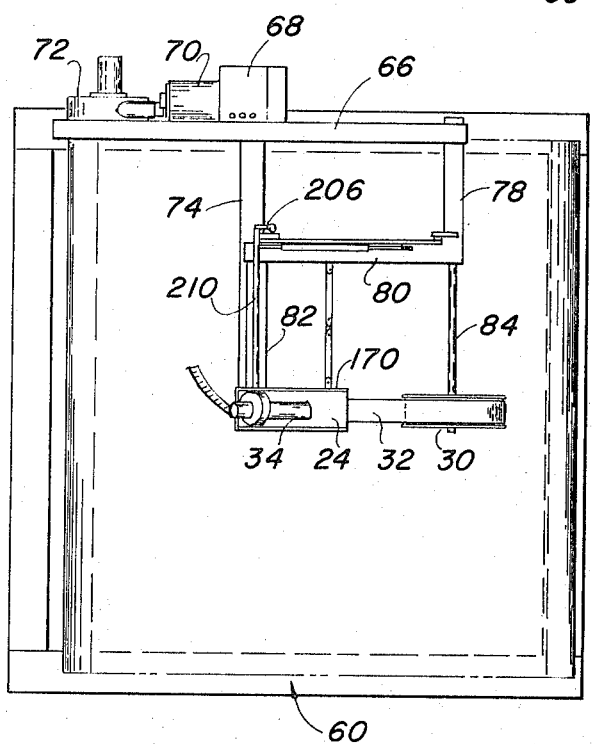
FIG. 14 is a top plan view of the strip applying apparatus.

As best seen from a comparison of FIG. 12 with FIGS. 11 and 13, that portion of the apparatus which includes upper or moveable head 24, tube 82, crank 80 and tube 78 is capable of pivotal movement upon the upper end of main frame member 66 between the closed or operative position illustrated in FIGS. 11 and 13 and an open or inoperative position in which head 24 is spaced from stationary head 18 as shown in FIG. 12.

Figure 15:
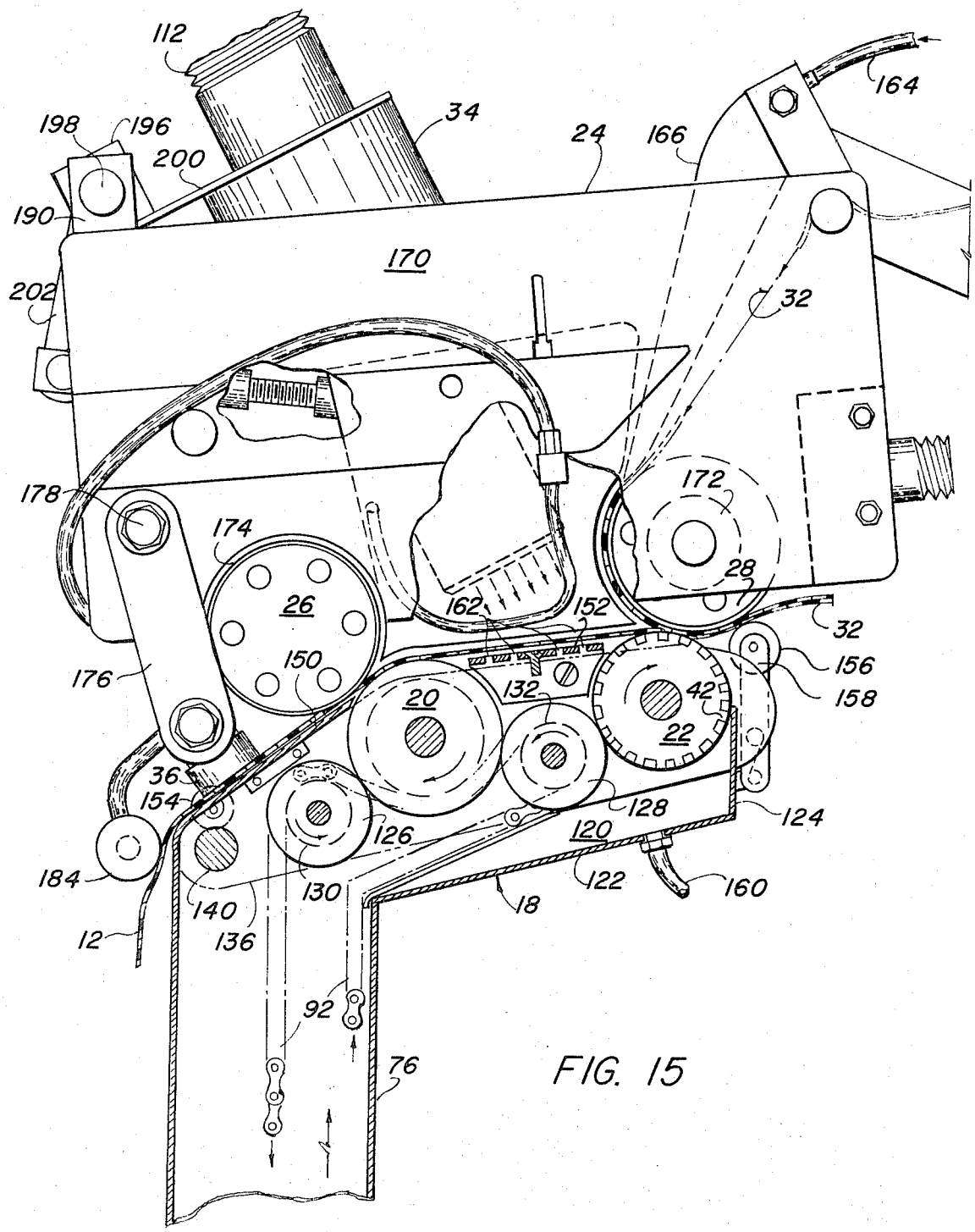
FIG. 15 is a detail side elevational view, with certain parts broken away or shown in section, showing details of the stationary and moveable head of the strip applying apparatus.
Figure 16:
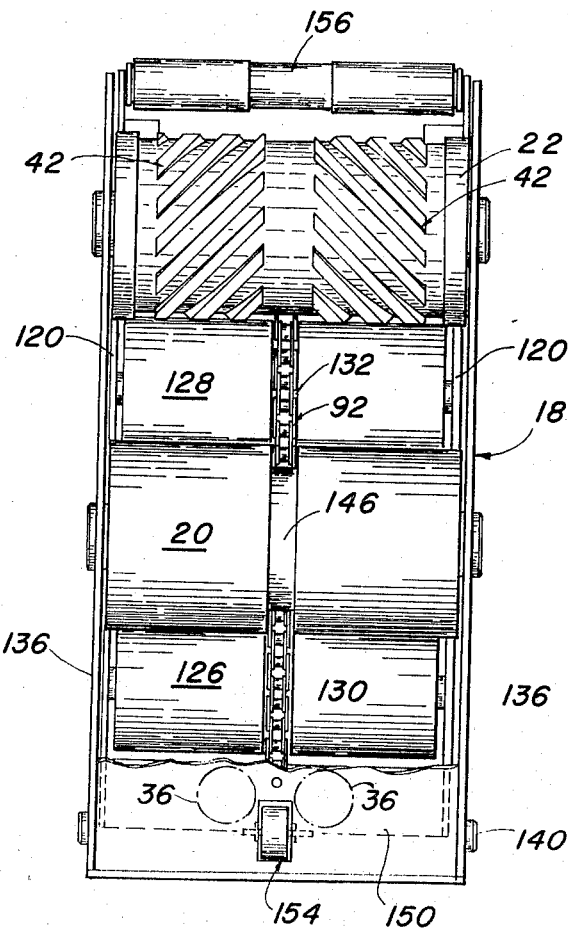
FIG. 16 is a top plan view of the stationary head with certain parts broken away.
Figure 17:
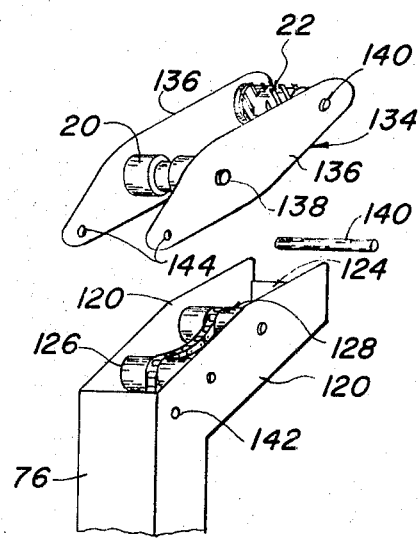
FIG. 17 is an exploded perspective view of the stationary head assembly.

The internal structure of stationary head 18 is best shown in FIGS. 15 through 17. Head 18 is fabricated with a pair of side plates 120 (FIG. 16), a bottom plate 122 and an end plate 124 which in effect form a hollow box-like structure which projects forwardly and somewhat upwardly from the upper end of frame post 76, to which the last described plates are fixedly secured. As best seen in FIG. 17, the stationary open box-like frame defined by side plates 120, bottom plate 122 and end plate 124 does not directly support drive rolls 20 and 22, but does rotatively support a pair of sprocket-roller elements 126 and 128, about which chain 92 is operatively trained. As best seen in the plan view of FIG. 16, the sprocket-roller units 126 and 128 are constructed in the form of a cylindrical roll having a reduced diameter section as at 130 and 132 within which the sprocket teeth are mounted. The radial depth of reduced diameter sections 130 and 132 is approximately equal to the thickness of chains 92 so that in passing through the reduced diameter sections 130 and 132, the chain does not project beyond the surface of the respective rolls.

Referring now to FIG. 17, it is seen that drive rolls 20 and 22 are rotably supported in what might be termed a floating yoke designated generally 134 which includes a pair of side plates 136 coupled to each other in spaced parallel relationship by a pair of shafts 138, 140 upon which rolls 20 and 22 are respectively supported for free rotation. Yoke assembly 134 is supported for floating pivotal movement upon side plates 120 of head 18 as by a pivot pin 140 which passes through aligned bores 142 and 144 respectively located in side plates 120 and the plates 136 of yoke 134.

Referring now particularly to FIGS. 15 and 16, it is seen that the axis of rotation of drive rolls 20 and 22 are located relative to those of rollers 126 and 128 so that rolls 20 and 22 are located in line contact with the cylindrical surfaces of rolls 126 and 128 when yoke 134 is gravitationally located in its normal position shown in FIG. 15. Roll 20, like rolls 126 and 128 is formed with a centrally located groove or reduced diameter section 146 of a depth sufficient to receive chain 92. The actual driving of rolls 20 and 22 is accomplished by virtue of the frictional contact with chain 92 and the cylindrical surfaces of rolls 126 and 128.

Figure 18:
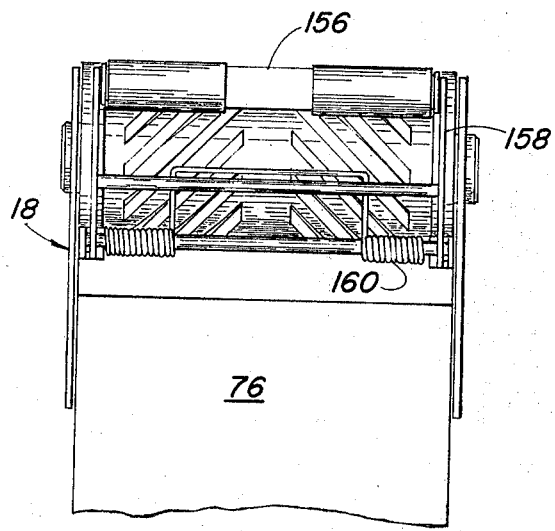
FIG. 18 is a front elevational view of the stationary head assembly.

As best seen in FIG. 15, the opening on the upper side of head 14 between the various rolls are normally closed by cover plates 150 and 152 detachably mounted upon and extending between side plates 120 at an elevation such that the upper portion of the periphery of rolls 20 and 22 project slightly above the support surfaces defined by the cover plates. A centrally located idler roller 154 (FIGS. 6 and 16) is mounted within cover plate 150 and projects above the surface of the plate to cooperate with guide rollers 36 in assuring that the upwardly projecting seam 12 is maintained between the two rollers 36 during the feeding operation. At the forward or discharge end of head 18, an auxiliary guide roller 156 is rotatably carried upon a spring loaded crank arm 158 to assist in separating the envelope from roll 22, the heated plastic material exhibiting some tendency to stick to the surfaces of roll 22 due to the localized regions of compression established by the teeth of herringbone gear sections 42. A torsion spring 160 (FIG. 18) resiliently biases crank arm 158 in a counterclockwise direction as viewed in FIG. 15.

As best seen in FIG. 15, plate 152 is depressed somewhat beneath the path of movement of material between rollers 20 and 22 so that the material being heated by the blast of hot air from the heat gun 34 will not contact the surface of plate 152. The force of heated air expelled from heat gun 34 tends to force the plastic material down toward plate 152, and to assure that the material floats freely above the surface of plate 152, cooling air under pressure is conducted into the interior of the stationary head via a conduit 160 and is expelled upwardly through perforations 162 in plate 152 to provide an air cushion supporting the plastic material clear of the surface of plate 152.

To minimize the possibility of the material of strip 32 sticking to the surface of roller 28, cooling air is likewise supplied through a conduit 164 and nozzle 166 to deflect heated air from heat gun 34 away from the strip 32 as it begins to pass around the periphery of roller 28.

Figure 19:
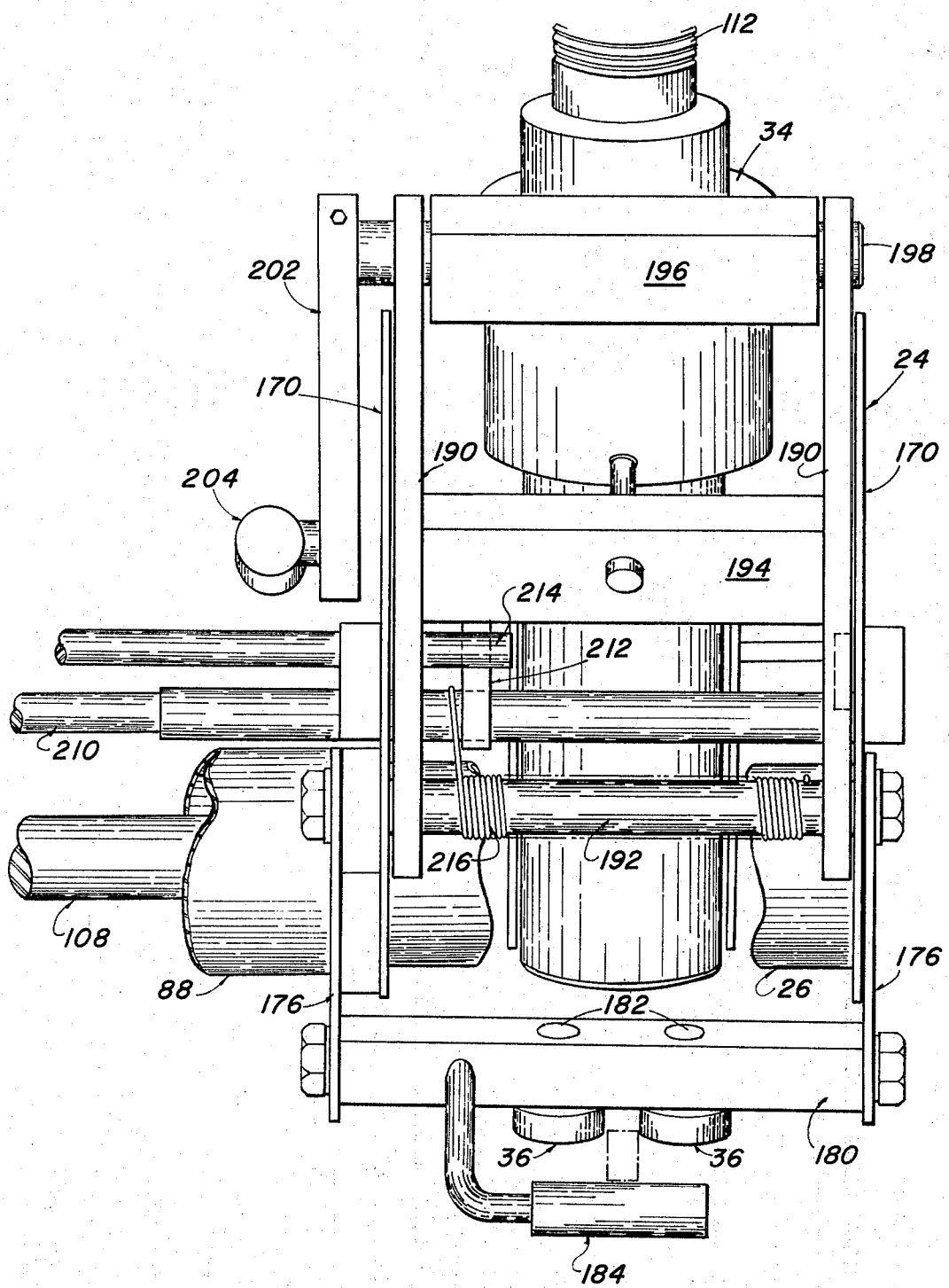
FIG. 19 is a detailed rear elevational view of the moveable head assembly, with certain parts broken away.

The structure of upper head assembly 24 is best shown in FIGS. 15 and 19. Head 24 includes a pair of generally rectangular vertically disposed side plates 170 which are located in spaced parallel relationship to each other.

Drive roll 28 is mounted in and between side plates 170 for rotation as by bearing assemblies 172, however, drive roll 26 is supported directly from shaft 88 (FIG. 19) and passes freely through recesses 174 formed in the side plates. The framework which includes side plates 170 is fixedly mounted upon tube 88 and supported by this latter tube.

Guide rollers 36 are supported from side plates 170 by a pair of arms 176 which are adjustably clamped to side plates 170 as by bolts 178. A cross piece member 180 is bolted to and extends between the lower ends of arms 76 to provide a support for a pair of spindles upon which the guide rollers 36 are mounted for free rotation. A hold down or smoothing roller 184 is likewise rotatively supported from cross member 180 at a location spaced upstream (with respect to the direction of feed of the envelope) from rollers 36 to smooth and flatten the envelope as it approaches rollers 36.

Heat gun 34 is mounted for movement relative to side plates 170 by a pivoting frame which includes a pair of spaced parallel arms 190 pivotally supported at their lower ends upon a fixed shaft 192 fixedly secured at its opposite ends to side plates 170. A rigid cross frame member 194 is fixedly secured at its opposite ends to arms 190 and extend between the arms approximately midway of their length. An elongate mounting block 196 is supported between the upper ends of arm 190 upon a shaft 198 rotatably supported within arms 190. Mounting block 196 serves as a mounting for a support bracket 200 (FIG. 15) which supports heat gun 34 from block 196.

Figure 20:
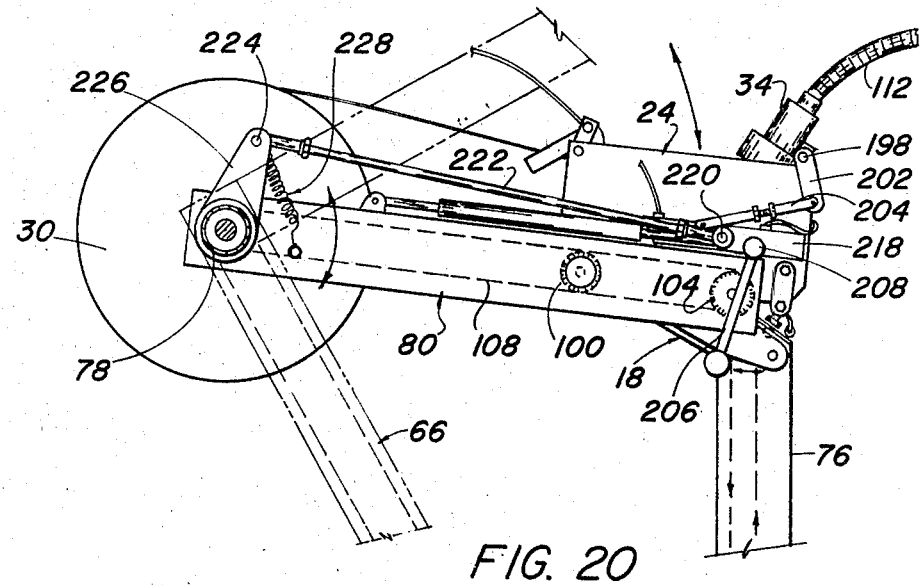
FIG. 20 is a detail side elevational view of the upper portion of a strip applying apparatus.
Figure 21:
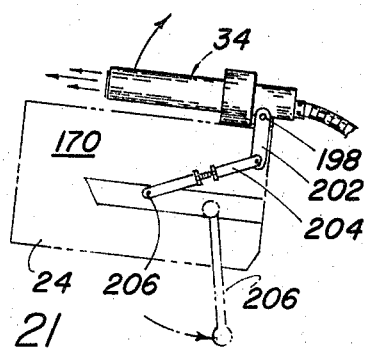
FIGS. 21 and 22 are schematic diagrams showing mechanism employed in manipulating the heat gun.
Figure 22:
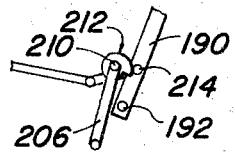
Figure 23:
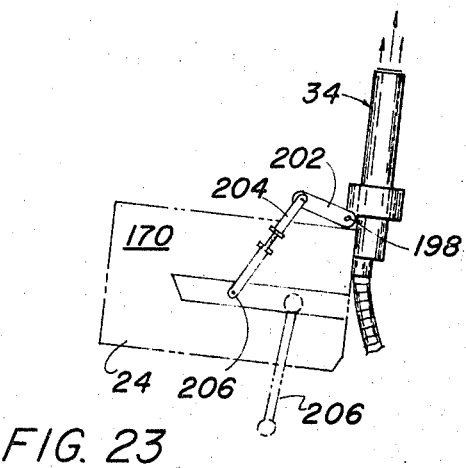
FIGS. 23 and 24 are schematic diagrams of the heat gun manipulating mechanism showing the mechanism in a different position.

As best seen in FIGS. 19 through 24, a crank arm 202 is fixedly pinned to one end of shaft 198 and is pivotally coupled at its opposite end to one end of a link 204 whose opposite end is pivotally connected to the adjacent side plate 170 as at 206 (FIGS. 21 and 23).

Raising and lowering of moveable head 24 is accomplished by a control linkage system which includes a control lever 206 mounted for pivotal movement in a bearing 208 which is in turn fixedly mounted on the right hand end of arm 80 as viewed in FIG. 20. Control lever 210 is fixedly secured to a shaft 210 (FIG. 14) coaxial with pivot 208 which extends from the control lever through the adjacent side plate 170 of moveable head 24.

Figure 24:
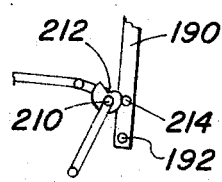

As best seen in the schematic diagrams of FIGS. 22 and 24, a cam 212 is fixedly mounted on the end of shaft 210 and the operating surface of cam 212 is engaged with a lug 214 fixedly secured to arm 190, the transverse location of these elements being best shown in FIG. 19. A torsion spring 216 wrapped around shaft 192 has one end secured to shaft 210 to resiliently bias the gun supporting frame including arms 190 in a counterclockwise direction as viewed in FIGS. 22 and 24 to resiliently bias stud 214 into contact with the surface of cam 212.

Referring now to FIG. 20 a crank arm 218 is fixedly secured to the upper end of control lever 206 and is pivotally connected as at 220 to one end of a control link 222 whose opposite end is pivotally connected as at 224 to the distal end of a stationary crank 226 fixedly mounted upon stationary tube 278. A tension spring 228 is likewise connected between fixed crank 226 and arm 80.

During operation of the machine, heat gun 34 continuously emits a blast of hot air at a temperature in the neighborhood of 500° F. When moveable head 24 is elevated from the position shown in FIG. 20 to that shown in FIG. 12, the blast of hot air emitted from the gun would be directed downwardly and create a safety problem in removing a seamed envelope from the stationary head 18 and also during the mounting of a new envelope to be seamed on the stationary head. The heat gun mounting and control linkage system described above operate in a manner such that the gun is automatically shifted to a safe upwardly directed position as the moveable head 24 is moved up into its open position.

Referring now to FIG. 20, in FIG. 20 moveable head 24 is in its closed or operating position, as is heat gun 34. In this position, heat gun 34 is held in the downwardly inclined position by crank arm 202 and link 204. Any attempt to pivot heat gun 34 in a clockwise direction about shaft 198 as viewed in FIG. 20 is prevented, because arm 202 which is fixed to shaft 198, and connects to the heat gun cannot pivot in a clockwise direction about the axis of shaft 198, because link 204 will prevent the lower end of arm 202 from moving to the left as viewed in FIG. 20. It will be noted that with the parts in the position shown in FIG. 20, the pivotal connection 220 between control crank arm 218 and link 222 is slightly overcenter — i.e. above a straight line connecting the axis of pivot point 208 and pivot point 224.

In order to shift moveable head 24 to its opened or nonoperative position, the machine operator grasps the lower end of control lever 206 and pulls it to the right from the position shown in FIG. 20 into the position shown in FIG. 21. Referring to FIG. 22, this counterclockwise movement of control lever 206 rotates cam 212 to drive a larger radius section of cam 212 into contact with stud 214, thus pivoting arms 190 in a clockwise direction about their support pivot. This clockwise movement of arms 190 moves gun support shaft 198 to the right from the FIG. 20 position. Because the lower end of arm 202 is held stationary by link 204, the movement to the right of the upper end of arm 202 occasioned by the righward movement of shaft 198 causes the crank to rotate shaft 198 in a direction swinging heat gun 34 upwardly through the FIG. 21 position until control lever 206 is at its maximum position of counterclockwise movement about pivot 208. This action straightens out the two links 218 and 222 and as their connecting pivot 220 tries to go below center in response to the counterclockwise force being applied at lever 206, tension is exerted on link 222 which exerts an upward or elevating force on the right hand end of arm 80 to begin to lift head 24 toward its elevated or open position.

Gun 34 continues to swing upwardly from the FIG. 21 position and the pivotal interconnection between arm 202 and link 204 passes about center. When control lever 206 is returned to a neutral position, as shown in FIG. 3, cam 212 is rotated toward a smaller radius section as shown in FIG. 24, permitting arms 190 to swing forwardly and effectively lock the heat gun in the straight up position shown in FIG. 23, because links 202 and 204 are now oriented to prevent any movement of the heat gun in a counterclockwise direction about shaft 198.

While one embodiment of the invention has been described in detail, it will be apparent to those skilled in the art that the disclosed embodiment may be modified. Therefore, the foregoing description is to be considered exemplary, rather than limiting, and the true scope of the invention is that defined in the following claims.

We claim:

1. The method of making a water-tight reinforced envelope from a pair of flexible water impervious thermoplastic sheets by bonding said sheets to each other in face-to-face engagement along their peripheral edges to form a closed envelope bonded with a first peripherally continuous water-tight seam, wherein the improvement comprises the steps of:

cutting a slit in one of the sheets for receiving a sealing head adapted for positioning within the interior of the envelope for compressive sealing cooperation with a moveable head in juxtaposition therewith exterior of the envelope, inserting said sealing head through said slit and positioning said sealing head within said envelope, feeding an elongate peripherally extending strip of thermoplastic material into overlying exterior relationship with said first seam and with said first seam extending along substantially the longitudinal center line of said strip, heating said envelope and seam immediately in front of the point of contact between said envelope and said strip, continuously compressing said strip to said heated envelope sheets along second peripherally continuous seams spaced from and on opposite sides of and parallel to said first seam to form two continuous spaced parallel bands respectively adjacent the side edges of said strip with said second seams continuously bonding said strip to respective ones of said sheets around the entire periphery of said envelope, compressing said strip to each of said heated envelope sheets at a plurality of spaced discontinuous central bonding zones extending generally transversely intermediate said spaced parallel bands and said first seam and in spaced relationship with respect to said bands and first seam, feeding said strip to cover the entire first peripheral seam and thermally bonding the ends of said strip to each other, and sealing said slit after withdrawal of the interior head from the envelope, thereby to form a water-tight leakproof reinforced seam envelope.

2. The method of making a water-tight reinforced envelope as defined in claim 1 including the steps of positioning said sheets between said sealing heads and moving said sheets and strip with respect thereto to produce said second seams and said central bonding zones continuously around the periphery of said envelope.

* * * * *